US007434491B1

(12) United States Patent
Sutton, Jr. et al.

(10) Patent No.: US 7,434,491 B1
(45) Date of Patent: Oct. 14, 2008

(54) FLEXIBLE TOOLING INTERFACE FOR HEADSTOCK/TAILSTOCK POSITIONER

(75) Inventors: George H. Sutton, Jr., Xenia, OH (US); Donald J. Metz, North Hampton, OH (US); Daniel W. Slanker, Huber Heights, OH (US)

(73) Assignee: Motoman, Inc., West Carrollton, OH (US)

( * ) Notice: Subject to any disclaimer, the term of this patent is extended or adjusted under 35 U.S.C. 154(b) by 1049 days.

(21) Appl. No.: 10/754,315

(22) Filed: Jan. 9, 2004

Related U.S. Application Data

(60) Provisional application No. 60/439,258, filed on Jan. 10, 2003.

(51) Int. Cl.
*B25J 17/00* (2006.01)
(52) U.S. Cl. .............. 74/490.01; 74/490.05; 74/490.06
(58) Field of Classification Search .............. 74/490.01, 74/490.03, 490.05, 490.06; 901/14, 15, 27, 901/28, 30
See application file for complete search history.

(56) References Cited

U.S. PATENT DOCUMENTS 4,541,062 A * 9/1985 Kada et al. ............... 700/247
4,872,619 A * 10/1989 Vaniglia ................... 242/437.3
5,914,002 A * 6/1999 Cahuzac ..................... 156/92
6,994,324 B2 * 2/2006 Harvey et al. .............. 254/388

OTHER PUBLICATIONS

K. N. Aronson, Inc., the new handbook of Positioneering, pp. 25-26, 2004.

* cited by examiner

Primary Examiner—David M Fenstermacher
(74) Attorney, Agent, or Firm—Dinsmore & Shohl LLP

(57) ABSTRACT

A workpiece positioner assembly comprises a headstock apparatus that is configured to rotate a workpiece A headstock interface assembly is configured to secure the workpiece to the headstock apparatus and comprises a bearing configured to enable pitch, yaw and roll movement of the headstock interface assembly relative to the headstock apparatus. The workpiece positioner assembly further comprises a tailstock apparatus configured to support the workpiece in cooperation with the headstock apparatus. The tailstock apparatus comprises a tailstock interface assembly that is configured to secure the workpiece to the tailstock apparatus. The tailstock interface assembly further comprises a tailstock bearing configured to enable axial movement of the workpiece relative to the tailstock apparatus.

44 Claims, 13 Drawing Sheets

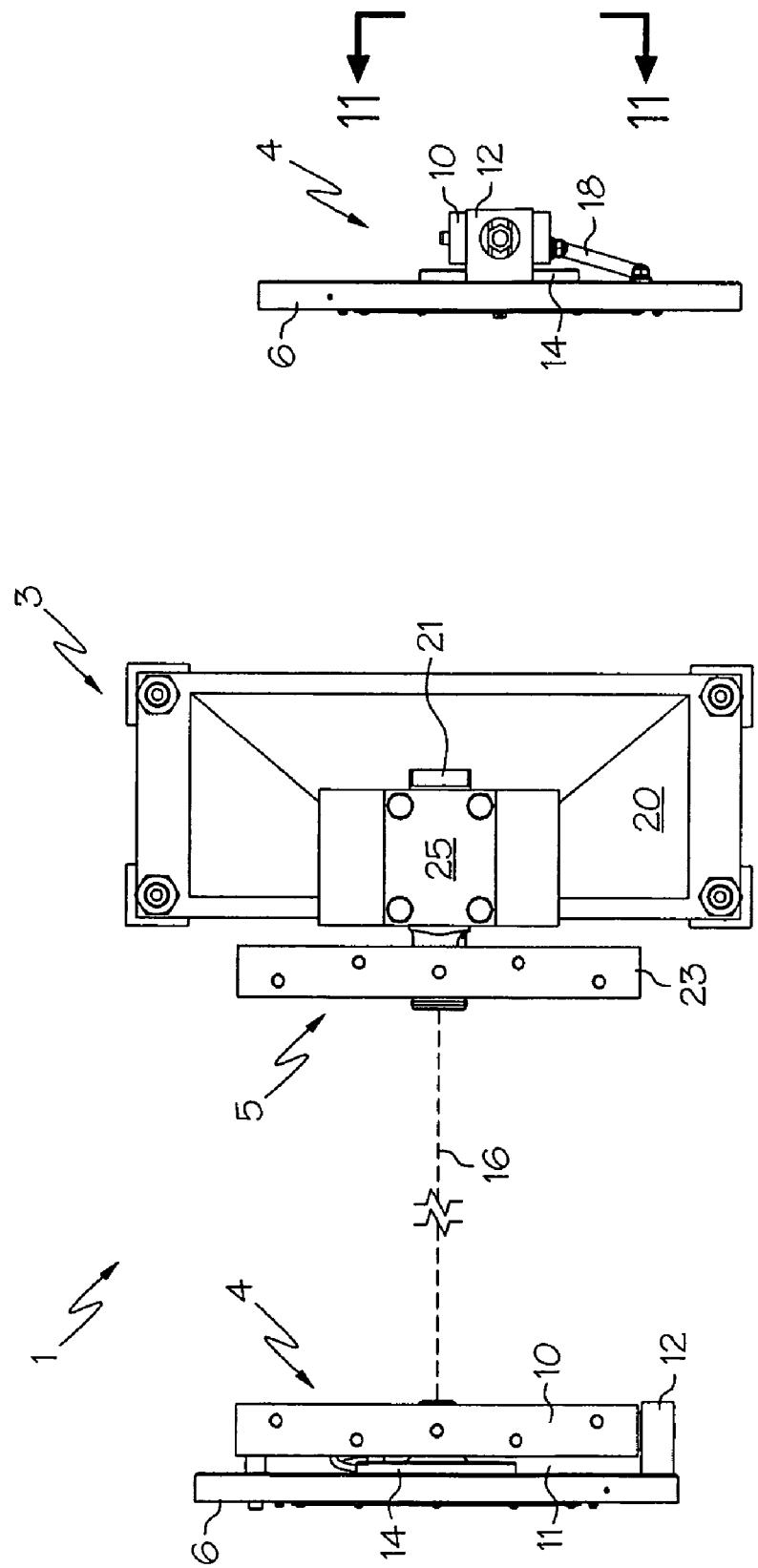

SIMPLE SUPPORT BEAM $$M = \frac{Fd}{2}$$

where d= distance from support bearing to tool attachment point

FLEXIBLE TOOLING INTERFACE FOR HEADSTOCK/TAILSTOCK POSITIONER

CROSS-REFERENCE TO RELATED APPLICATION

This application claims the benefit of U.S. Provisional Application Ser. No. 60/439,258, filed Jan. 10, 2003 and entitled "MOTOMOUNT AND MOTOMOUNT HD", the disclosure of which is incorporated herein by reference.

BACKGROUND OF THE INVENTION

The present invention relates to headstock/tailstock positioners and, more particularly, to a flexible tooling interface for headstock/tailstock positioners that can be employed in combination with an industrial robot.

Industries often employ industrial robots for a variety of applications in the course of manufacturing. While many industrial robot arms are able to function on several rotational axes, manufacturing efficiency can be improved by employing a manipulator or positioner in cooperation with the robot arm. The positioner can be utilized to position an otherwise static series of workpieces relative to the industrial robot such that the workpieces, one after the other, may be processed. The positioner also helps optimize the process and throughput.

However, when using a positioner in a fixed headstock/tailstock configuration, the centerlines of the headstock and tailstock faceplates, as well as the tooling fixedly mounted thereto, must be in proper alignment. Inaccuracies in the tooling can and often will cause misalignment of the headstock/tailstock configuration. Misalignment can create additional headstock bearing loads and rotational drag, stalling and/or premature failure causing damage to the drive assembly and, therefore, increasing costs. Other problems caused by misalignment of the assembly include shearing of the tooling from the positioner and/or distortion of the workpiece.

The present inventors have recognized a need for improvements in tooling mount or interface assemblies for robotic headstock/tailstock positioner design.

SUMMARY OF THE INVENTION

The present invention meets the above-mentioned need by providing a flexible tooling mount or interface for headstock/tailstock positioners. Although the present invention is not limited to specific advantages or functionality, it is noted that the flexible tooling mount or interface assembly when employed with a headstock/tailstock positioner assembly provides improved tooling repeatability as compared to hard-mounted positioners. The flexible tooling mount or interface assembly will eliminate the additional headstock bearing loads induced by tooling and headstock/tailstock misalignments (up to design limits), and transmit only the predictable moment loads resulting from simple beam loading. By minimizing the bending moments on headstock/tailstock positioner assemblies, the present invention can significantly reduce the setup costs typically associated with such positoner systems and increase their useful lifetimes.

In accordance with one embodiment of the present invention, a device comprising a workpiece positioner assembly is provided, the workpiece positioner assembly comprising a headstock apparatus and a tailstock apparatus. The headstock apparatus is configured to rotate a workpiece and comprises a headstock interface assembly. The headstock interface assembly is configured to secure a workpiece to the headstock apparatus and comprises a substantially spherical bearing configured to enable pitch, yaw and roll movement of the headstock interface assembly relative to the headstock apparatus. The tailstock apparatus is configured to support the workpiece in cooperation with the headstock apparatus and comprises a tailstock interface assembly. The tailstock interface assembly is configured to secure the workpiece to the tailstock apparatus and comprises a tailstock bearing configured to enable axial movement of the workpiece relative to the tailstock apparatus. The tailstock bearing can also be configured to enable pitch, yaw and roll movement of the tailstock interface assembly relative to the tailstock apparatus.

In accordance with another embodiment of the present invention, a device comprising a workpiece positioner assembly is provided, the workpiece positioner assembly comprising a headstock apparatus and a tailstock apparatus. The headstock apparatus is configured to rotate a workpiece and comprises a headstock interface assembly. The headstock interface assembly is configured to secure a workpiece to the headstock apparatus and comprises a substantially spherical bearing configured to enable pitch, yaw and roll movement of the headstock interface assembly relative to the headstock apparatus. The tailstock apparatus is configured to support the workpiece in cooperation with the headstock apparatus and comprises a tailstock interface assembly. The tailstock interface assembly is configured to secure the workpiece to the tailstock apparatus and comprises a tailstock bearing configured to enable axial movement of the workpiece relative to the tailstock apparatus. The tailstock bearing can also be configured to enable pitch, yaw and roll movement of the tailstock interface assembly relative to the tailstock apparatus. The headstock interface assembly and the tailstock interface assembly are each configured to eliminate additional bearing loads induced by misaligning the headstock apparatus or the tailstock apparatus out of a stance of alignment.

In accordance with still another embodiment of the present invention, a device comprising a workpiece positioner assembly is provided, the workpiece positioner assembly comprising a headstock apparatus and a tailstock apparatus. The headstock apparatus is configured to rotate a workpiece and comprises a headstock faceplate and headstock interface assembly. The headstock interface assembly comprises an interface mounting module, a headstock workpiece mounting module, and a guide module comprising a bushing block and a pin. The headstock workpiece mounting module comprises a substantially spherical bearing configured to enable pitch, yaw and roll movement of the headstock workpiece mounting module relative to the headstock apparatus. The interface mounting module is secured to the headstock faceplate and the headstock workpiece mounting module is secured to the interface mounting module. The headstock workpiece mounting module is configured to secure the workpiece to the headstock apparatus. The guide module is secured to the interface mounting module, the pin is in communication with the headstock workpiece mounting module, the bushing block is positioned between the guide module and the pin, and the bushing block enables the pin to rotate and translate within the guide module providing pitch and yaw compliance. Further, the tailstock is configured to support the workpiece in cooperation with the headstock apparatus and comprises a substantially spherical pillow block bearing and a tailstock interface assembly. The tailstock interface assembly is configured to secure the workpiece to the tailstock apparatus and comprises a shaft and a tailstock workpiece mounting module. The tailstock workpiece mounting module is secured to the shaft, and the shaft is positioned within the substantially spherical pillow block bearing. The substantially spherical pillow block bearing is configured to enable axial movement of the workpiece relative to the tailstock apparatus. The substantially spherical pillow block bearing can also be configured to enable pitch, yaw and roll movement of the tailstock interface assembly relative to the tailstock apparatus.

In accordance with yet another embodiment of the present invention, a device comprising a workpiece positioner assembly is provided comprising a headstock apparatus and a tailstock apparatus. The headstock apparatus is configured to rotate a workpiece and comprises a headstock faceplate and headstock interface assembly. The headstock interface assembly comprises a hub, a headstock workpiece mounting module, and a guide module comprising a cam follower bearing. The headstock workpiece mounting module comprises a substantially spherical bearing configured to enable pitch, yaw and roll movement of the headstock workpiece mounting module relative to the headstock apparatus. The hub is secured to the headstock faceplate and the headstock workpiece mounting module is secured to the hub. The headstock workpiece mounting module is configured to secure the workpiece to the headstock apparatus. The guide module is secured to the headstock faceplate, and the cam follower bearing is in communication with the headstock workpiece mounting module. The cam follower bearing is configured to rotate and translate within the headstock workpiece mounting module providing pitch and yaw compliance. The tailstock apparatus is configured to support the workpiece in cooperation with the headstock apparatus and comprises a tailstock interface assembly and a shaft clamp. The tailstock interface assembly is configured to secure the workpiece to the tailstock apparatus and comprises a shaft and a tailstock workpiece mounting module. The tailstock workpiece mounting module comprises a substantially spherical bearing configured to enable axial movement of the workpiece relative to the tailstock apparatus. The shaft is slideably engaged within the substantially spherical bearing and the shaft is positioned within the shaft clamp. The substantially spherical bearing can also be configured to enable pitch, yaw and roll movement of the tailstock interface assembly relative to the tailstock apparatus.

These and other features and advantages of the invention will be more fully understood from the following detailed description of the invention taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings, where like structure is indicated with like reference numerals and in which:

FIG. 7 is an overhead view of a workpiece positioner assembly shown in accordance with one embodiment of the present invention;

FIG. 8 is a side view of a headstock interface assembly shown in accordance with one embodiment of the present invention;

Skilled artisans appreciate that elements in the figures are illustrated for simplicity and clarity and have not necessarily been drawn to scale. For example, the dimensions of some of the elements in the figures may be exaggerated relative to other elements to help improve understanding of embodiment(s) of the present invention.

DETAILED DESCRIPTION OF SOME EMBODIMENTS OF THE INVENTION

Figure 1:
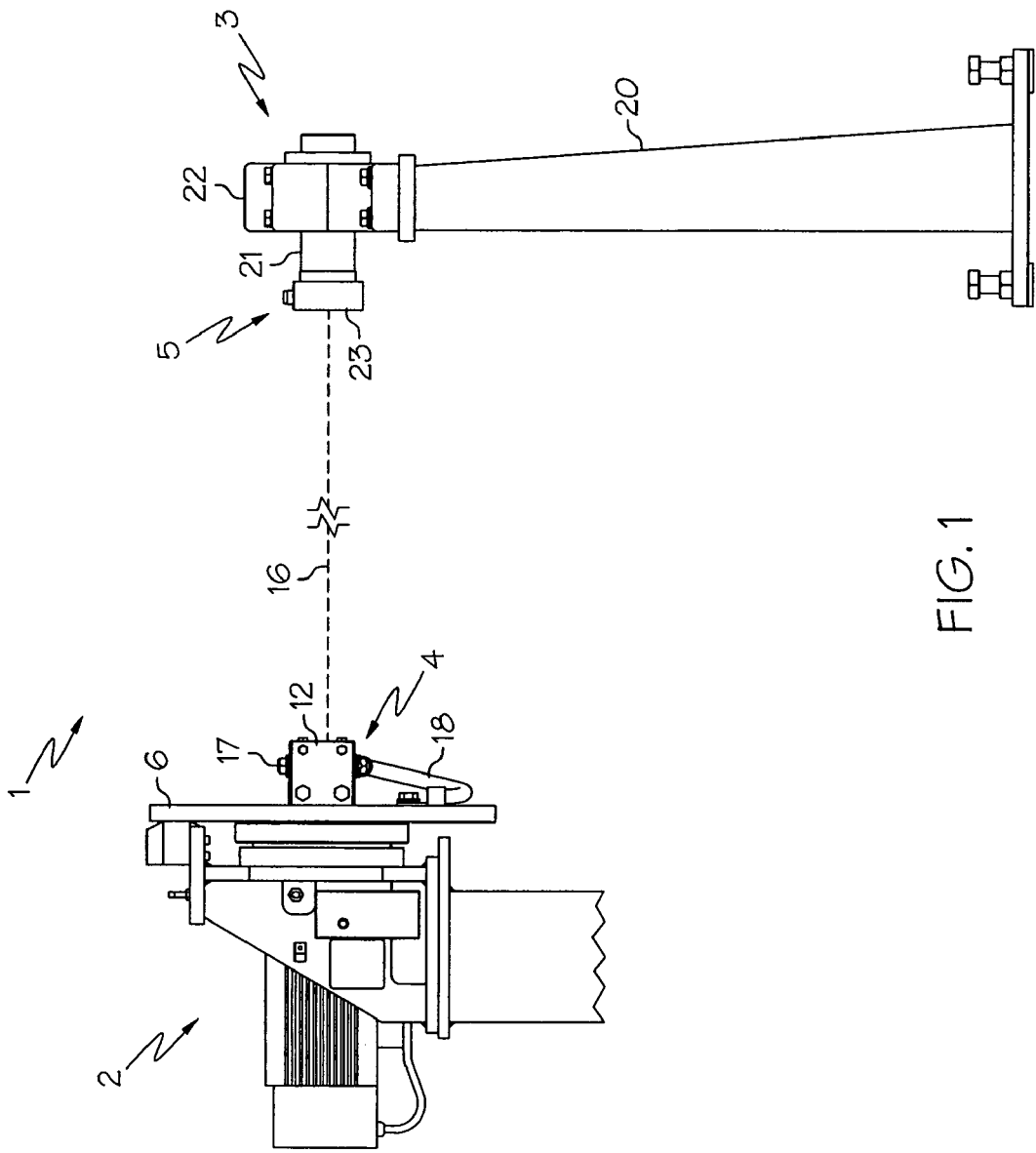
FIG. 1 is an side view of a workpiece positioner assembly shown in accordance with one embodiment of the present invention.
Figure 2:
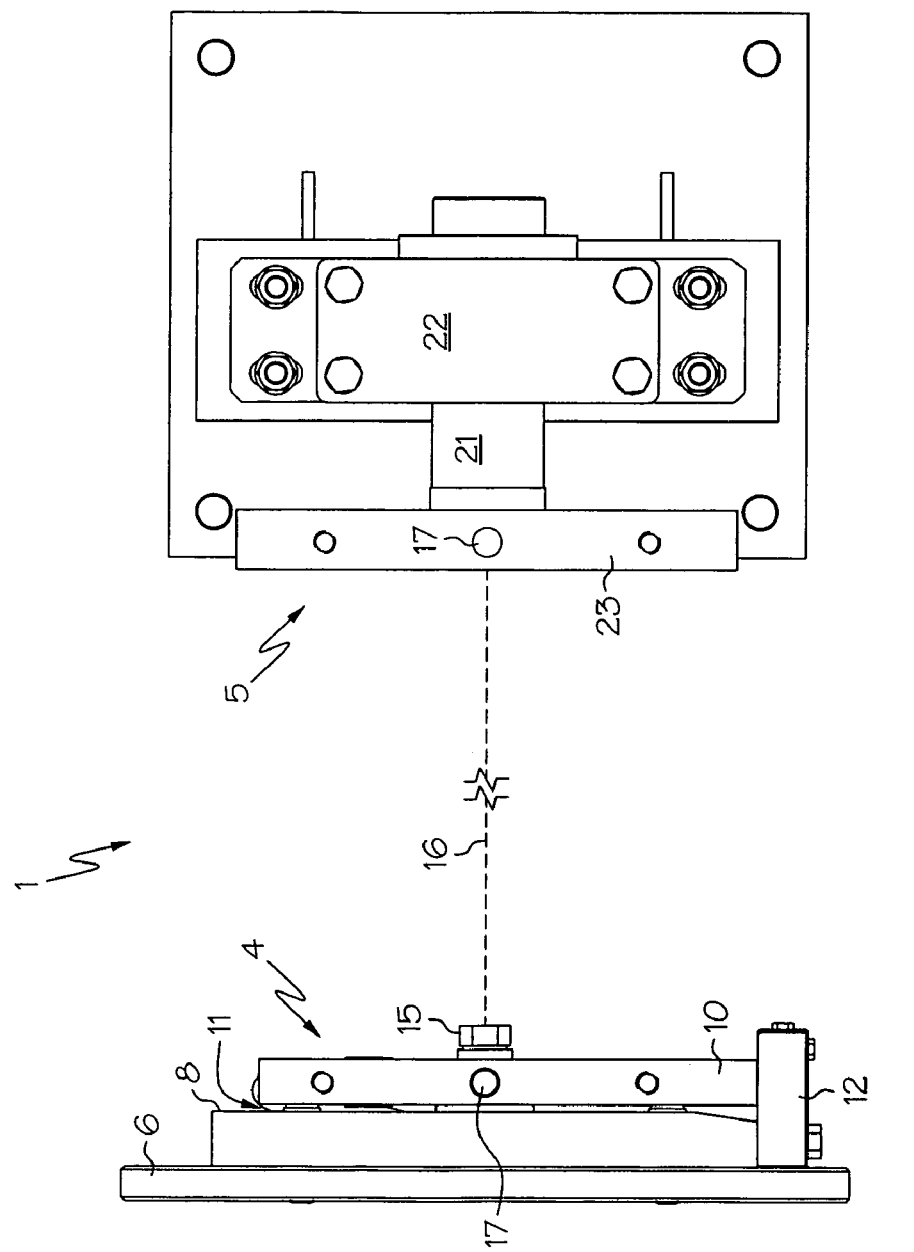
FIG. 2 is an overhead view of a workpiece positioner assembly shown in accordance with one embodiment of the present invention.

Referring initially to FIGS. 1 and 2, a device comprising a workpiece positioner assembly 1 is illustrated in accordance with one embodiment of the present invention. The workpiece positioner assembly 1 comprises a headstock apparatus 2 and a tailstock apparatus 3. The headstock apparatus 2 comprises a headstock interface assembly 4 that is configured to secure a part or workpiece to the headstock apparatus 2. In addition, the tailstock apparatus 3 comprises a tailstock interface assembly 5 that is configured to secure the workpiece to the tailstock apparatus 3. Accordingly, the workpiece positioner assembly 1 is configured to suspend a workpiece between the headstock apparatus 2 and the tailstock apparatus 3. More particularly, the workpiece positioner assembly 1 is configured to suspend a workpiece between the headstock interface assembly 4 and the tailstock interface assembly 5. The headstock and tailstock interface assemblies 4, 5 can be provided as a modular accessory for existing headstock/tailstock positioner assemblies, or as a component within a complete robotic system, which system can include one or more articulating robotic arms and one or more companion headstock/tailstock workpiece positioner assemblies.

As noted in the Background of the Invention, traditional fixed tooling mounting systems for headstock/tailstock positioners require that the centerlines of the headstock and tailstock faceplates (and tooling secured thereto) be precisely aligned. Accordingly, the use of such fixed mounting positioners often results in increased costs and loss of productivity due to the need for specialized machined bases, spanners, tooling, and precision tailstocks, which ensure that the centerlines of the two positioner faceplates coincide. Although the workpiece positioner assembly 1 can certainly be used when the headstock apparatus 2 and tailstock apparatus 3 are properly aligned, in accordance with the present invention, the assembly 1 provides for rotational movement of a workpiece even when the headstock apparatus 2 and tailstock apparatus 3 are out of alignment.

The workpiece positioner assembly 1 defines a stance of alignment between the headstock apparatus 2 and the tailstock apparatus 3, and when the headstock and tailstock apparatus 2, 3 are positioned within the stance of alignment a substantially direct centerline 16 is defined between the headstock apparatus 2 and the tailstock apparatus 3 (see FIGS. 1 and 2). By "substantially direct centerline", we mean that the axes of rotation of the headstock and tailstock apparatus 2, 3 coincide, such that a beam of light shot from the axis of rotation of the headstock interface assembly 4 would hit the axis of rotation of the tailstock interface assembly 5 (and tooling attached thereto), when arranged in a headstock/tailstock configuration.

Figure 20:
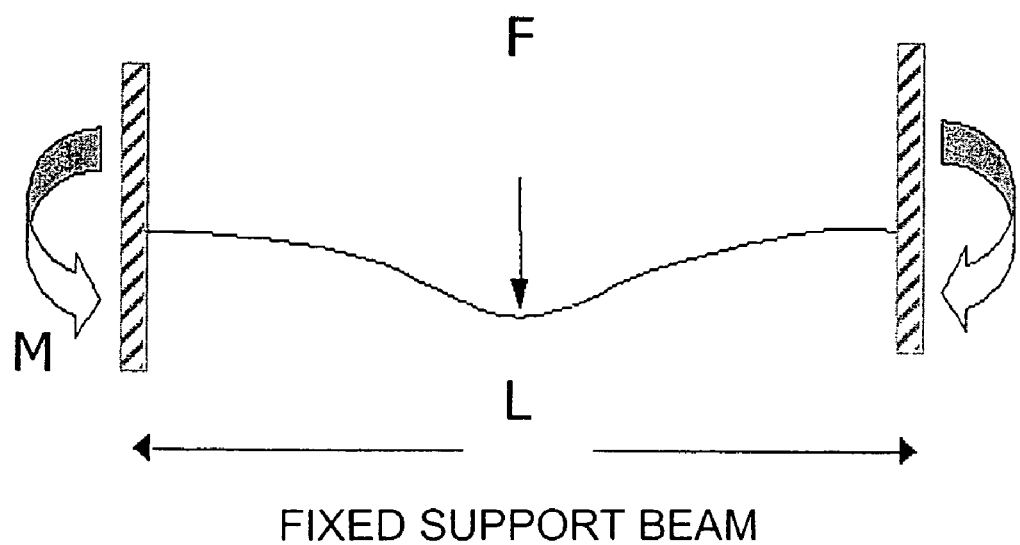
FIG. 20 is a schematic illustration of the increased bending moment associated with traditional fixed mounting systems for headstock/tailstock positioners.
Figure 21:
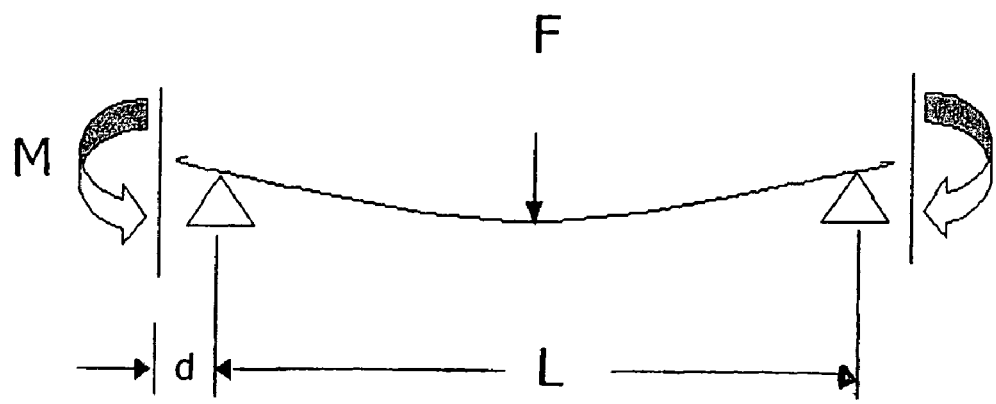
FIG. 21 is a schematic illustration of the reduced bending moment associated with the use of the workpiece positioner assembly of the present invention.
Figure 22:
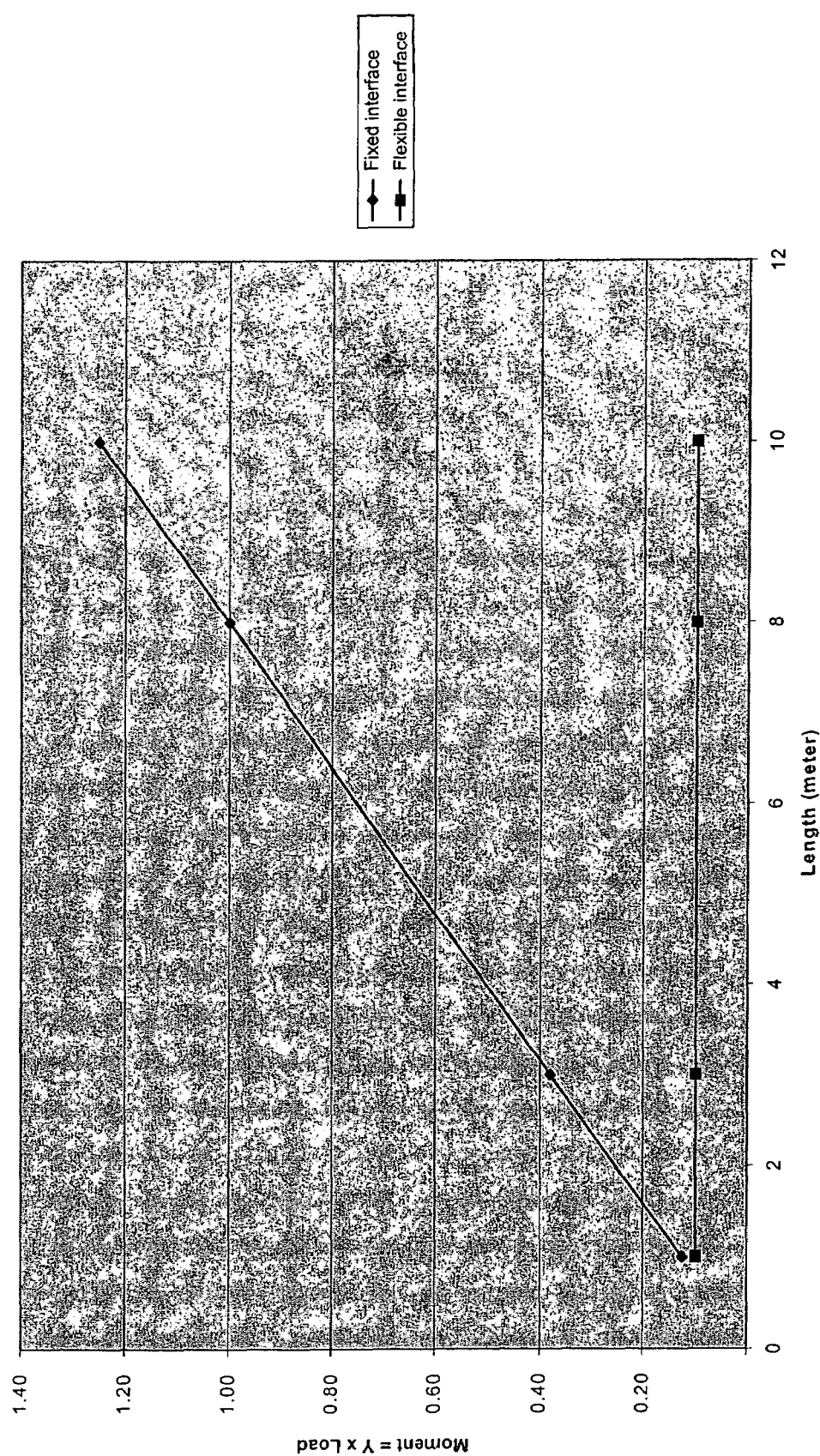
FIG. 22 is a plot diagram illustrating the constant bending moment associated across the span of a workpiece when employing a workpiece positioner assembly in accordance with one embodiment of the present invention, as compared to the increased bending moment associated with traditional fixed mounting systems for headstock/tailstock positioners.

In accordance with the present invention, the headstock and tailstock interface assemblies 4, 5 are each configured to not only secure and suspend a workpiece between the headstock and tailstock apparatus 2, 3, but also rotate the workpiece when the headstock and tailstock apparatus 2, 3 are out of the stance of alignment, without imparting rotational drag and additional bearing loads (bending moment) on the workpiece positioner assembly J. For instance, FIG. 20 illustrates schematically the high bending moment (M) associated with traditional fixed mounting systems when a bearing load (F) of a workpiece (fixed support beam) of a certain length (L) is suspended between the headstock and tailstock positioners (i.e., $$M = \frac{FL}{8},$$

from beam deflection theory). In contrast, FIG. 21 illustrates the reduced bending moment associated with the use of the present invention, which effectively supports the workpiece as a simply supported beam. This significantly reduces and controls the moment loads imposed on the assembly 1, $$(M = \frac{Fd}{2},$$

where d is the very short and constant distance from the support bearing to the workpiece attachment point) and, therefore, increases positioner performance and life. FIG. 22 further illustrates the constant bending moment associated across the span of a workpiece when employing the workpiece positioner assembly 1 herein described, as compared to the increased bending moment associated with fixed mounting systems for headstock/tailstock positioners of the prior art.

Accordingly, the present invention enables rotation of a workpiece by the workpiece positioner assembly 2 when either or both the headstock and tailstock apparatus 2, 3 are displaced from the substantially direct centerline 16 in a horizontal orientation, a vertical orientation, or both a horizontal and vertical orientation. The present invention also enables rotation of a workpiece by the workpiece positioner assembly 1 without imparting additional stress on the assembly 1 when either or both the headstock and tailstock apparatus 2, 3 are horizontally or vertically displaced from the substantially direct centerline 16, or horizontally and vertically displaced from the substantially direct centerline 16. More particularly, the present invention enables rotation of a workpiece by the workpiece positioner assembly 1 when either or both the headstock and tailstock apparatus 2, 3 are out of the stance of alignment.

In accordance with the present invention, the headstock apparatus 2 can comprise an electrically powered drive assembly or headstock positioner, which is configured to "position" or rotate the otherwise static workpiece, in cooperation with the tailstock apparatus 3, relative to an industrial robotic arm for more effective processing of workpieces during manufacturing. Thus, the device comprising the workpiece positioner assembly 1 can further comprise one or more industrial robots. Examples of such headstock positioners include the MH Series available from Motoman, Inc. (West Carrollton, Ohio), which can accommodate loads weighing up to about 6000 kg. Accordingly, the workpiece positioner assembly 1 can accommodate and rotate workpieces weighing up to about 1000 kg (see FIGS. 1 and 2) as well as up to about 6000 kg (see FIG. 7), depending upon which particular embodiment is employed.

The headstock interface assembly 4 is secured to the headstock apparatus 2. More particularly, as illustrated in FIGS. 2-6a, the headstock apparatus 2 can further comprise a headstock faceplate 6, and the headstock interface assembly 4 is secured to the headstock faceplate 6. As is also illustrated in FIGS. 2 and 4-6a, the headstock interface assembly 4 can further comprise an interface mounting module 8, which module 8 is secured to the headstock apparatus 2. More particularly, the interface mounting module 8 can be secured to the headstock faceplate 6. In accordance with the present invention, the headstock interface assembly 4 can further comprise a headstock workpiece mounting module 10, which workpiece mounting module 10 is secured to the interface mounting module 8 (see FIGS. 2 and 4-6a). A workpiece or part can be secured to the headstock workpiece mounting module 10 at a first terminal end thereof, either directly or via a tooling apparatus 7, which tooling apparatus 7 is secured to the workpiece mounting module 10 (see FIGS. 3 and 4). The assembly 1 can be configured to accept tooling made for hard-mount block-type systems and provides for reduced tooling costs by employing lower-precision mounting holes, which provides for simple and efficient workpiece/tooling changeover.

Figure 4:
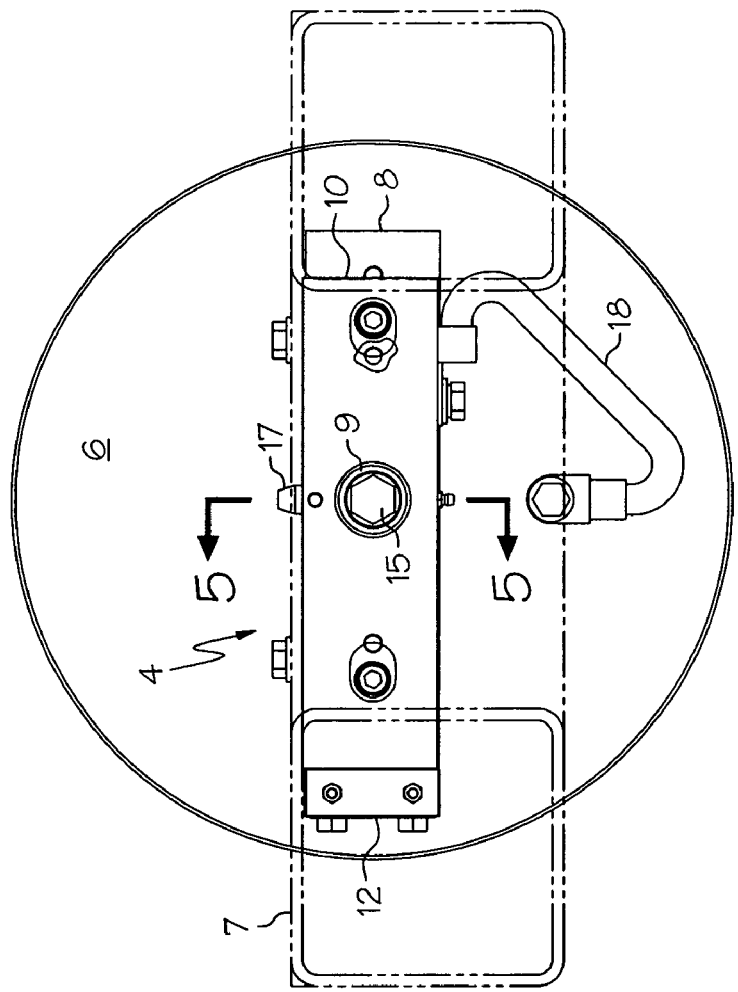
FIGS. 3 and 4 are side and front views, respectively, of a headstock interface assembly and tooling apparatus shown in accordance with one embodiment of the present invention.
Figure 5:
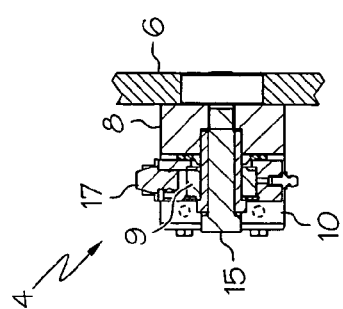
Figure 10:
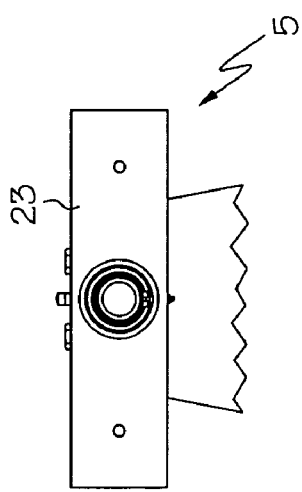
FIGS. 9 and 10 are side and front views, respectively, of a tailstock apparatus and tailstock interface assembly shown in accordance with one embodiment of the present invention.

As shown in FIG. 5, the headstock interface assembly 4 can further comprise a substantially spherical bearing 9, which bearing 9 is positioned within the headstock workpiece mounting module 10. By "substantially spherical bearing" we mean any conceivable type of bearing having at least one spherical surface that enables an object to have a degree of freedom in three distinct axes. The workpiece mounting module 10 is secured to the interface mounting module 8 by a fixture 15, which fixture 15 transects the substantially spherical bearing 9 (see FIGS. 2 and 4-6*a*). As shown in FIG. 2, the headstock interface assembly 4 further defines a gap 11 between the interface mounting module 8 and the headstock workpiece mounting module 10, which gap 11 enables the headstock workpiece mounting module 10 to move about the substantially spherical bearing 9. The pitch, yaw and roll movement of the workpiece mounting module 10 about the substantially spherical bearing 9 enables the headstock interface assembly 4 to self align with the accompanying tailstock interface assembly 5, accommodating for any misalignment between the headstock and tailstock apparatus 2, 3. A locating pin 17 is provided to position a workpiece onto the headstock workpiece mounting module 10 (see FIGS. 1-2 and 4-6*a*).

Figure 6A:
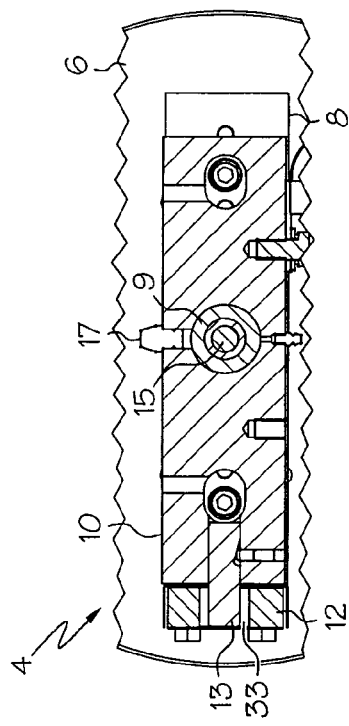
FIGS. 5 and 6a are side and front views, respectively, of a headstock interface assembly shown in cross-section in accordance with one embodiment of the present invention.
Figure 6B:
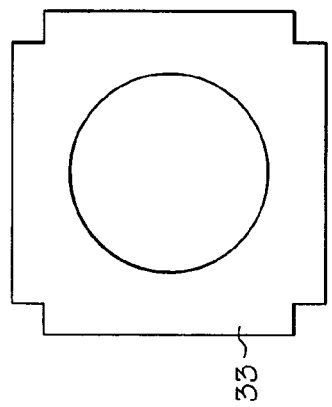
FIG. 6b is a side view of a bushing block apparatus shown in accordance with one embodiment of the present invention.

In accordance with the present embodiment, the headstock interface assembly 4 can further comprise a guide module 12, which guide module 12 is secured to the interface mounting module 8 (see FIGS. 1, 4 and 6*a*). As illustrated in FIGS. 6*a* and 6*b*, the guide module 12 can comprise a bushing block 33 and a pin 13, which pin 13 is in communication with the headstock workpiece mounting module 10. The bushing block 33 is positioned between the guide module 12 and the pin 13, which bushing block 33 enables the pin 13 to rotate and translate within the guide module 12, thus providing pitch and yaw compliance while restricting roll movement of the headstock workpiece mounting module 10. Accordingly, the guide module 12, bushing block 33 and pin 13 ensure that adequate torsional rigidity is maintained by the headstock interface assembly 4, while still enabling the headstock workpiece mounting module 10 to compensate for misalignments in the headstock and tailstock apparatus 2, 3, which is accomplished by moving the headstock workpiece mounting module 10 about the substantially spherical bearing 9 in the horizontal plane. As will be understood by those skilled in the art, such adequate torsional rigidity is important when manipulating heavy parts or workpieces using the workpiece positioner assembly 1, given the rotation of the headstock/tailstock apparatus 2, 3 and the length of the workpiece that spans the void defined between the headstock apparatus 2 and the tailstock apparatus 3.

Figure 3:
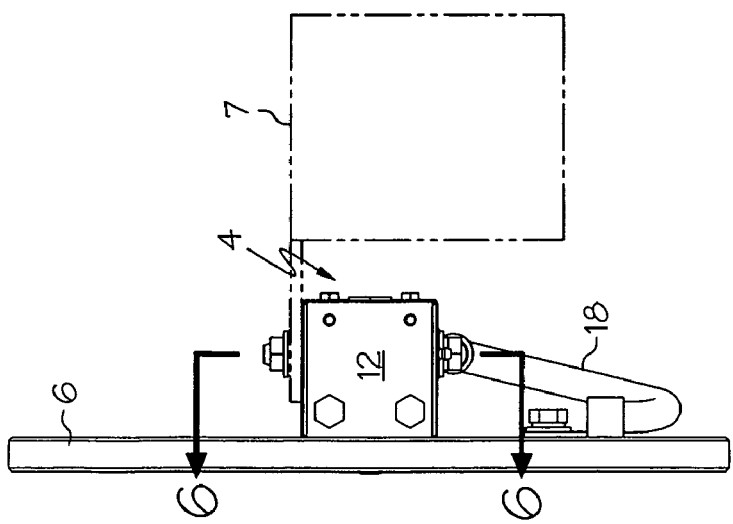

For welding applications, the workpiece assembly 1 comprises at least one grounding cable 18 to route ground current away from the substantially spherical bearing 9 (see FIGS. 1 and 3-4). Also, the headstock and tailstock apparatus 2, 3 can be provided with a locking mechanism that assists in workpiece installation as well as other features and components commonly included in headstock and tailstock apparatus design.

The tailstock apparatus 3, in accordance with the present embodiment of the invention, can further comprise a tailstock pedestal 20 and a substantially spherical pillow block bearing 22 (see FIGS. 1 and 2). The tailstock apparatus 3 rotates to self-align with the accompanying headstock apparatus 2, which headstock apparatus 2 includes the drive assembly. The tailstock pedestal 20 is mounted upon a frame or floor and the substantially spherical pillow block bearing 22 is mounted to the tailstock pedestal 20. As illustrated in FIGS. 1 and 2, the tailstock interface assembly 5 is in communication with the substantially spherical pillow block bearing 22. More particularly, the tailstock interface assembly 5 can further comprise a shaft 21 and a tailstock workpiece mounting module 23, which workpiece mounting module 23 is secured to the shaft 21, and the shaft 21 is positioned within the substantially spherical pillow block bearing 22. A workpiece or part can be secured to the tailstock workpiece mounting module 23 at a second terminal end thereof, which second terminal end is opposite the first terminal end of the workpiece, which first terminal end is secured to the headstock workpiece mounting module 10. The second terminal end of the workpiece can be secured to the tailstock workpiece mounting module 23 either directly or via a tooling apparatus 7, which tooling apparatus 7 is secured to the tailstock workpiece mounting module 23, and can be tooling made for hard-mount block-type systems.

The shaft 21 is slideably engaged within the substantially spherical pillow block bearing 22, which is configured to enable pitch, yaw and roll movement of the shaft 21 relative to the tailstock apparatus 3. Accordingly, the substantially spherical pillow block bearing 22 is configured so that the tailstock workpiece mounting module 23 is allowed to float along the axial plane of the workpiece, such that the tailstock interface assembly 5 adjusts for any misalignment between the headstock and tailstock apparatus 2, 3 in response to the headstock workpiece mounting module 10 pivoting about the substantially spherical bearing 9 at the opposite terminal end of the workpiece. In addition, the shaft 21 can define a hollow interior, which is configured for passage of electrical connections, pneumatic connections, and combinations thereof for operation of the tooling 7.

In accordance with another embodiment of the present invention, which is illustrated in FIGS. 7-8, 11 and 16-19, the interface mounting module 8 is replaced with a hub 14. Much like the interface mounting module 8 described above, the hub 14 can be secured to the headstock faceplate 6. The present hub configuration enables the headstock interface assembly 4 to accommodate increased bearing loads by extending through the headstock workpiece mounting module 10. Accordingly, instead of the fixture 15, the hub 14 transects the substantially spherical bearing 9. As further shown in FIG. 16, a gap 11 is defined between the hub 14 and the headstock workpiece mounting module 10, which gap 11 enables the pitch, yaw and roll movement of the workpiece mounting module 10 about the substantially spherical bearing 9, and thus compensate for misalignments between the headstock and tailstock apparatus 2, 3. A locating pin 17 is provided to position a workpiece onto the headstock workpiece mounting module 10 about the substantially spherical bearing 9.

Figure 11:
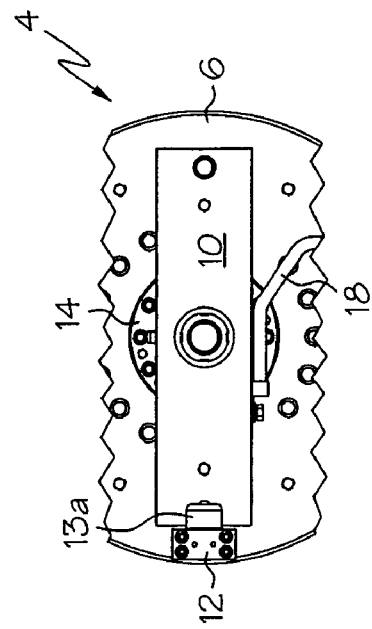
FIG. 11 is a front view of a headstock interface assembly shown in accordance with one embodiment of the present invention.
Figure 9:
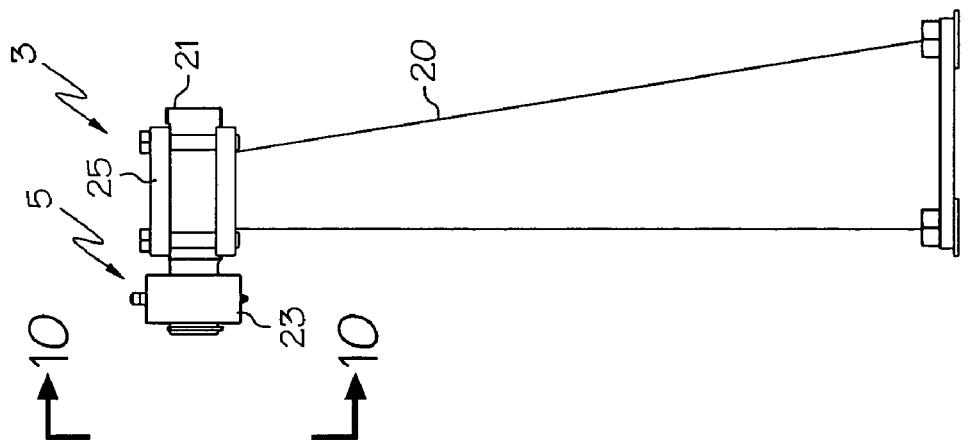
Figure 12:
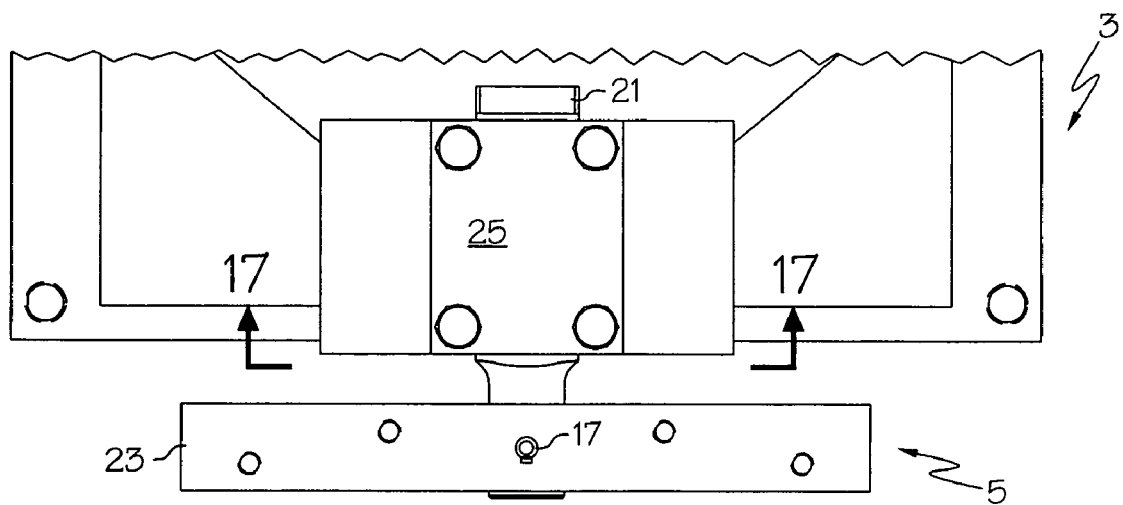
FIGS. 12 and 13 are overhead and front views, respectively, of a tailstock interface assembly shown in accordance with one embodiment of the present invention.
Figure 13:
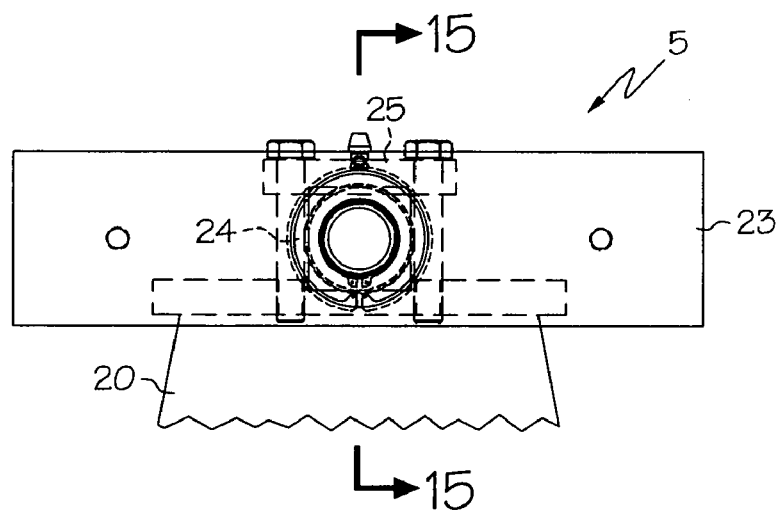
Figure 14:
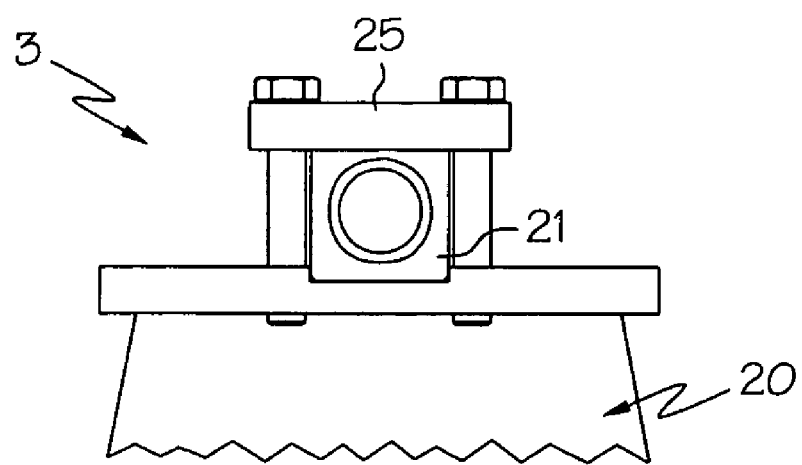
FIG. 14 is a front view of a tailstock interface assembly shown in accordance with one embodiment of the present invention.
Figure 15:
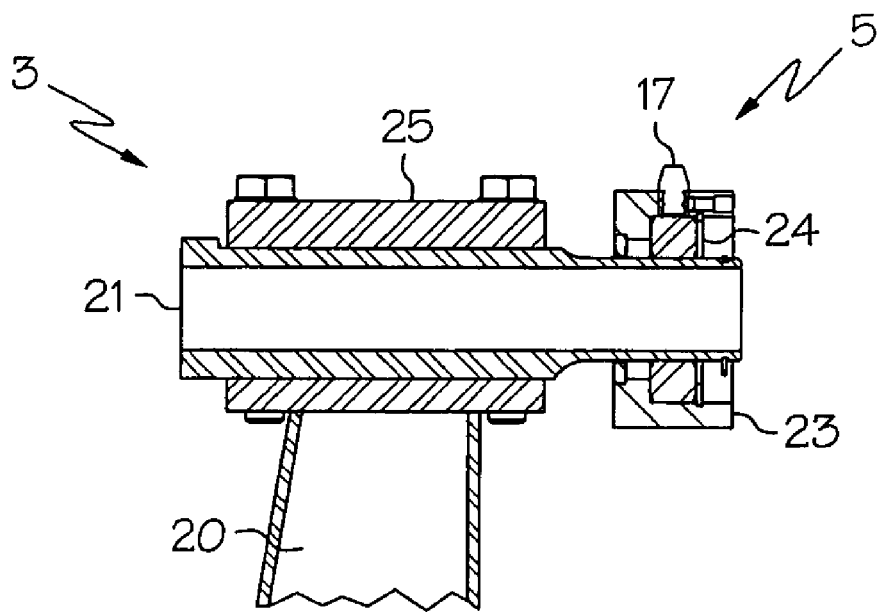
FIG. 15 is a side, cross-sectional view of a tailstock interface assembly shown in accordance with one embodiment of the present invention.
Figure 16:
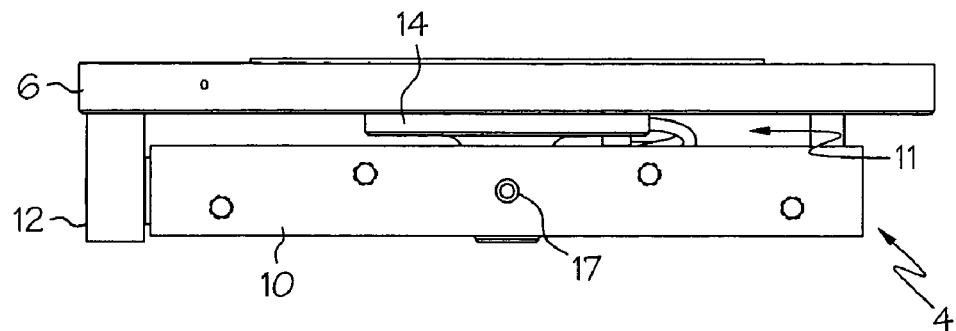
FIGS. 16 and 17 are overhead and front views, respectively, of a headstock interface assembly shown in accordance with one embodiment of the present invention.
Figure 17:
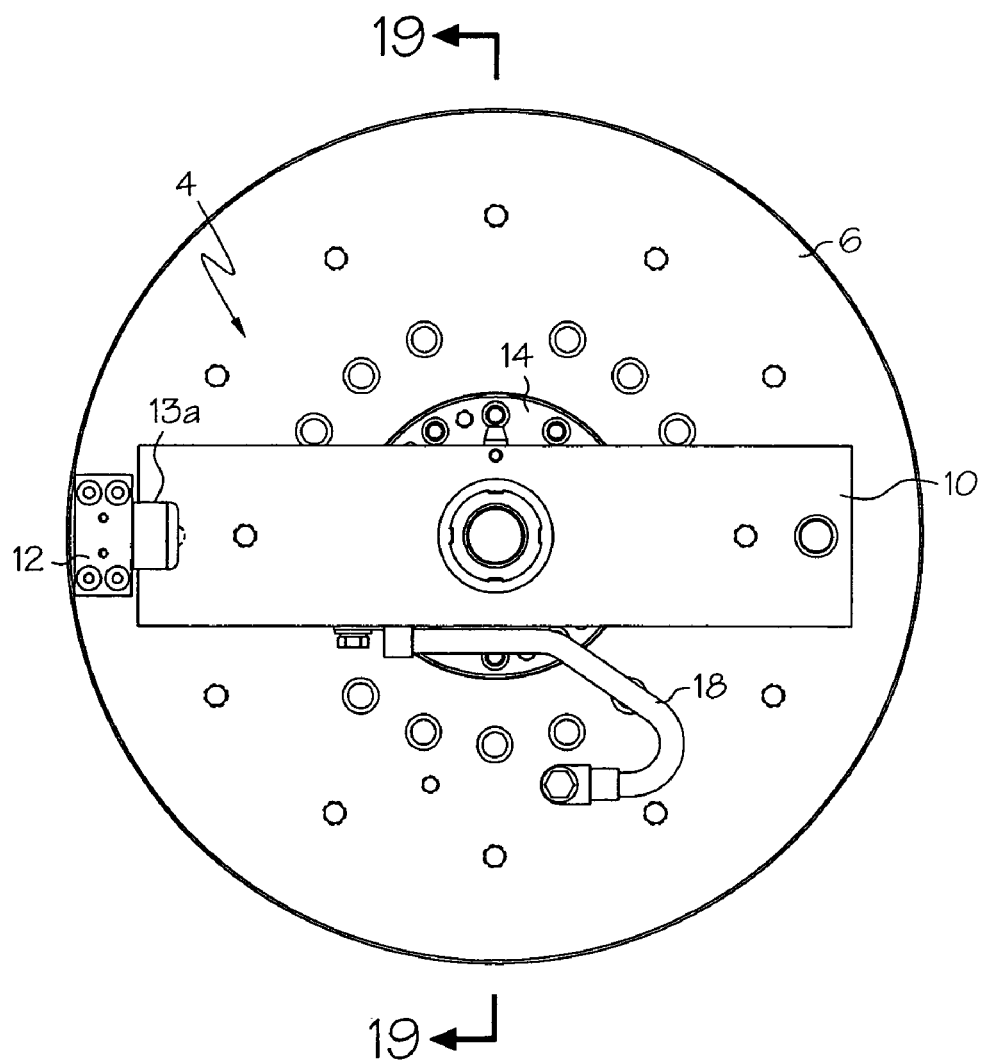
Figure 18:
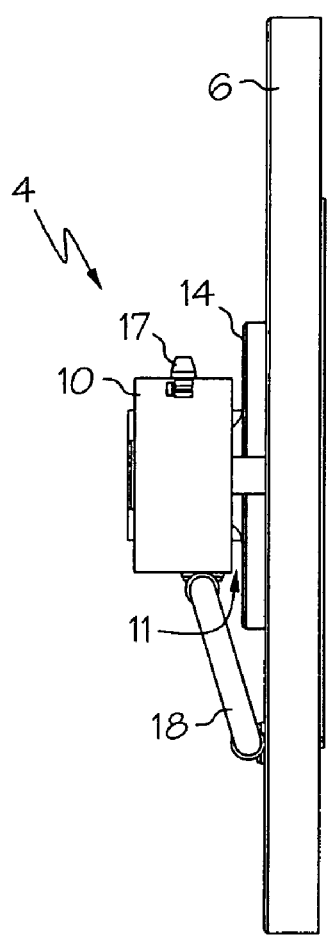
FIGS. 18 and 19 are side and side, cross-sectional views, respectively, of a headstock interface assembly shown in accordance with one embodiment of the present invention.
Figure 19:
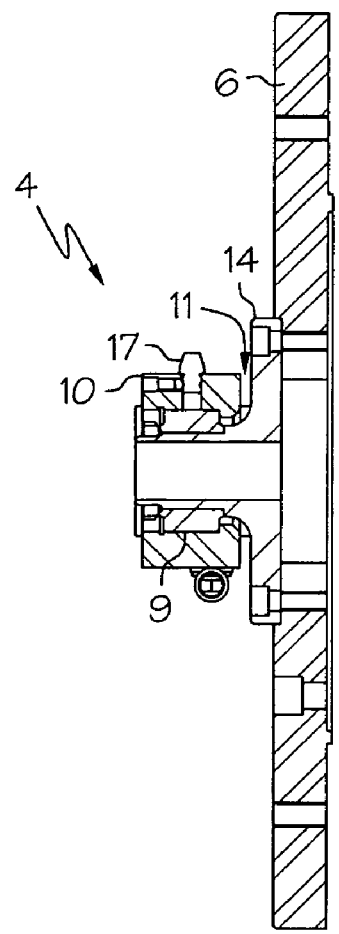

In accordance with the present embodiment, the guide module 12 is secured directly to the headstock faceplate 6 instead of the interface mounting module 8 (see FIGS. 7-8 and 16). This imparts additional strength for accommodating increased bearing loads. As illustrated in FIGS. 11 and 17, the guide module 12 can comprise a cam follower bearing 13*a*, which is in communication with the headstock workpiece mounting module 10. The cam follower bearing 13*a* is configured to rotate and translate within the headstock workpiece mounting module 10, thus providing pitch and yaw compliance while restricting roll movement of the workpiece mounting module 10 about the substantially spherical bearing 9, imparting greater torsional rigidity (see FIG. 17).

The tailstock apparatus 3 further comprises a tailstock pedestal 20, which tailstock pedestal 20 is mounted upon a frame or floor. As illustrated in FIGS. 7, 9, 12, 13 and 15, the tailstock interface assembly 5 is mounted to the tailstock pedestal 20. More particularly, the tailstock interface assembly 5 can further comprise a shaft 21 and a tailstock workpiece mounting module 23, which workpiece mounting module 23 is engaged with the shaft 21, and the shaft 21 is secured to the tailstock pedestal 20. The tailstock apparatus 3 can further comprise a shaft clamp 25, which shaft clamp 25 is configured to secure the shaft 21 to the tailstock pedestal 20. Further, the tailstock interface assembly 5 can comprise a substantially spherical bearing 24, which spherical bearing 24 is positioned within the tailstock workpiece mounting module 23. The shaft 21 is slideably engaged with the substantially spherical bearing 24, enabling the tailstock workpiece mounting module 23 to move about the shaft 21 in three distinct axes. Accordingly, the substantially spherical bearing 24 is configured so that the tailstock workpiece mounting module 23 is allowed to float along the axial plane of the workpiece, as well as to pivot or move in association with the degree of misalignment between the headstock and tailstock apparatus 2, 3. In addition, the shaft 21 can define a hollow interior, which is configured for passage of electrical connections, pneumatic connections, and combinations thereof for operation of a workpiece tooling apparatus (see FIGS. 7, 9-10 and 12-15).

In accordance with the present embodiment, a workpiece or part can be secured to the tailstock workpiece mounting module 23 at the second terminal end thereof, which second terminal end is opposite the first terminal end. The second terminal end of the workpiece can be secured to the tailstock workpiece mounting module 23 either directly or via the tooling apparatus 7, which tooling apparatus 7 is secured to the tailstock workpiece mounting module 23 and can comprise tooling made for hard-mount block-type systems.

As a result of not imposing additional bearing loads on the headstock and tailstock apparatus 2, 3 when positioned out of the stance of alignment, the present invention also provides for improved pose repeatability over a series of runs. For example, the present invention can define a rated repeatability of about ±0.125 mm at a turning radius of about 380 mm.

While the invention has been described by reference to certain embodiments, it should be understood that numerous changes could be made within the spirit and scope of the inventive concepts described. Accordingly, it is intended that the invention not be limited to the disclosed embodiments, but that is have the full scope permitted by the language of the following claims.

What is claimed is:

1. A device comprising a workpiece positioner assembly, said workpiece positioner assembly comprising a headstock apparatus and a tailstock apparatus, wherein:
    said headstock apparatus is configured to rotate a workpiece and comprises a headstock interface assembly;
    said headstock interface assembly is configured to secure said workpiece to said headstock apparatus;
    said headstock interface assembly comprises a bearing configured to enable pitch, yaw and roll movement of said headstock interface assembly relative to said headstock apparatus;
    said tailstock apparatus is configured to support said workpiece in cooperation with said headstock apparatus and comprises a tailstock interface assembly;
    said tailstock interface assembly is configured to secure said workpiece to said tailstock apparatus;
    said tailstock interface assembly comprises a tailstock bearing configured to enable axial movement of said workpiece relative to said tailstock apparatus;
    said tailstock apparatus further comprises a tailstock pedestal;
    said tailstock interface assembly further comprises a shaft secured to said tailstock pedestal;
    said tailstock bearing defines a substantially spherical bearing; and
    said shaft is slideably engaged within said substantially spherical bearing to enable axial movement of said workpiece relative to said tailstock apparatus.

2. The device of claim 1, wherein
    said workpiece positioner assembly defines a stance of alignment between said headstock apparatus and said tailstock apparatus,
    when said headstock apparatus and said tailstock apparatus are positioned within said stance of alignment a substantially direct centerline is defined between said headstock apparatus and said tailstock apparatus, and
    said headstock interface assembly and said tailstock interface assembly are configured to secure said workpiece between said headstock apparatus and said tailstock apparatus when said headstock apparatus and said tailstock apparatus are out of said stance of alignment.

3. The device of claim 2, wherein said headstock interface assembly and said tailstock interface assembly are each configured to eliminate additional bearing loads induced by misaligning said headstock apparatus or said tailstock apparatus out of said stance of alignment.

4. The device of claim 2, wherein:
    said headstock apparatus defines a position that is horizontally displaced, vertically displaced, or horizontally and vertically displaced from said substantially direct centerline;
    said tailstock apparatus defines a position that is horizontally displaced, vertically displaced, or horizontally and vertically displaced from said substantially direct centerline;
    said headstock apparatus defines a position that is horizontally displaced, vertically displaced, or horizontally and vertically displaced from said substantially direct centerline, and said tailstock apparatus is positioned within said stance of alignment;
    said tailstock apparatus defines a position that is horizontally displaced, vertically displaced, or horizontally and vertically displaced from said substantially direct centerline, and said headstock apparatus is positioned within said stance of alignment; or
    said headstock apparatus defines a position that is horizontally displaced, vertically displaced, or horizontally and vertically displaced from said substantially direct centerline, and said tailstock apparatus defines a position that is horizontally displaced, vertically displaced, or horizontally and vertically displaced from said substantially direct centerline.

5. The device of claim 2, wherein said headstock apparatus is out of said stance of alignment by at least about ±2 degrees of said substantially direct centerline.

6. The device of claim 2, wherein said tailstock apparatus is out of said stance of alignment by at least about ±2 degrees of said substantially direct centerline.

7. The device of claim 2, wherein said headstock apparatus and said tailstock apparatus are each out of said stance of alignment by at least about ±2 degrees of said substantially direct centerline.

8. The device of claim 1, wherein said headstock apparatus further comprises a headstock faceplate, and wherein said headstock interface assembly is secured to said headstock faceplate.

9. The device of claim 8, wherein said headstock interface assembly further comprises an interface mounting module, and wherein said interface mounting module is secured to said headstock faceplate.

10. The device of claim 9, wherein
    said headstock interface assembly further comprises a headstock workpiece mounting module,
    said headstock workpiece mounting module is secured to said interface mounting module, and said headstock workpiece mounting module is secured to a section of said workpiece.

11. The device of claim 10, wherein said bearing is positioned within said headstock workpiece mounting module, and wherein said headstock workpiece mounting module is secured to said interface mounting module through said bearing.

12. The device of claim 9, wherein said interface mounting module comprises a hub.

13. The device of claim 9, wherein said headstock interface assembly further comprises a guide module, and wherein said guide module is secured to said interface mounting module or said headstock faceplate.

14. The device of claim 13, wherein said guide module comprises a bushing block and a pin, and wherein said pin is in communication with a headstock workpiece mounting module.

15. The device of claim 14, wherein said bushing block is positioned between said guide module and said pin, and wherein said bushing block enables said pin to rotate and translate within said guide module providing pitch and yaw compliance.

16. The device of claim 14, wherein said bushing block and said pin are configured to restrict the roll movement of said headstock workpiece mounting module.

17. The device of claim 13, wherein said guide module comprises a cam follower bearing, and wherein said cam follower bearing is in communication with a headstock workpiece mounting module.

18. The device of claim 17, wherein said cam follower bearing is configured to rotate and translate within said headstock workpiece mounting module providing pitch and yaw compliance.

19. The device of claim 17, wherein said cam follower bearing is configured to restrict the roll movement of said headstock workpiece mounting module.

20. The device of claim 1, wherein said bearing defines a substantially spherical bearing.

21. The device of claim 1, wherein said device is configured to impart a rated repeatability of about ±0.125 mm at a turning radius of about 380 mm.

22. The device of claim 1, wherein said device is configured to rotate loads weighing between about 1 and about 6000 kg.

23. The device of claim 1, wherein said device further comprises one or more industrial robots.

24. The device of claim 1, wherein said workpiece positioner assembly further comprises at least one grounding cable.

25. The device of claim 1, wherein said tailstock bearing defines a substantially spherical pillow block bearing.

26. The device of claim 25, wherein said tailstock apparatus further comprises a tailstock pedestal, wherein said tailstock pedestal is mounted upon a frame or floor, and wherein said substantially spherical pillow block bearing is mounted to said tailstock pedestal.

27. The device of claim 26, wherein
said tailstock interface assembly further comprises a shaft and a tailstock workpiece mounting module,
said tailstock workpiece mounting module is secured to said shaft,
said tailstock workpiece mounting module is secured to a section of said workpiece, and
said shaft is positioned within said substantially spherical pillow block bearing.

28. The device of claim 27, wherein said shaft is slideably engaged within said substantially spherical pillow block bearing which said engagement enables said axial movement of said workpiece relative to said tailstock apparatus.

29. The device of claim 28, wherein said engagement of said shaft within said substantially spherical pillow block bearing imparts said headstock apparatus and said tailstock apparatus to rotate said workpiece without imposing additional bearing loads on said headstock apparatus and said tailstock apparatus, said additional bearing loads induced by misaligning said headstock apparatus and said tailstock apparatus out of a stance of alignment.

30. A device comprising a workpiece positioner assembly, said workpiece positioner assembly comprising a headstock apparatus and a tailstock apparatus, wherein:
said headstock apparatus is configured to rotate a workpiece and comprises a headstock interface assembly;
said headstock interface assembly is configured to secure said workpiece to said headstock apparatus;
said tailstock apparatus is configured to support said workpiece in cooperation with said headstock apparatus and comprises a tailstock interface assembly;
said tailstock interface assembly is configured to secure said workpiece to said tailstock apparatus;
said headstock interface assembly comprises a bearing configured to enable pitch, yaw and roll movement of said headstock interface assembly relative to said headstock apparatus;
said tailstock interface assembly comprises a substantially spherical pillow block bearing;
said tailstock interface assembly further comprises a shaft and a tailstock workpiece mounting module secured to said shaft; and
said substantially spherical pillow block bearing is configured to enable pitch, yaw and roll movement of said shaft relative to said tailstock apparatus.

31. The device of claim 30, wherein said shaft defines a hollow interior for passage of electrical connections, pneumatic connections, and combinations thereof.

32. A device comprising a workpiece positioner assembly, said workpiece positioner assembly comprising a headstock apparatus and a tailstock apparatus, wherein:
said headstock apparatus is configured to rotate a workpiece and comprises a headstock interface assembly;
said headstock interface assembly is configured to secure said workpiece to said headstock apparatus;
said tailstock apparatus is configured to support said workpiece in cooperation with said headstock apparatus and comprises a tailstock interface assembly;
said tailstock interface assembly is configured to secure said workpiece to said tailstock apparatus;
said tailstock interface assembly comprises a tailstock bearing;
said headstock interface assembly comprises an interface mounting module, a headstock workpiece mounting module secured to said interface mounting module, and a bearing positioned within said workpiece mounting module; and
said bearing positioned within said workpiece mounting module is configured to enable pitch, yaw and roll movement of said headstock workpiece mounting module relative to said headstock apparatus.

33. The device of claim 32, wherein said movement of said headstock workpiece mounting module imparts said headstock apparatus and said tailstock apparatus to rotate said workpiece without imposing additional bearing loads on said headstock apparatus and said tailstock apparatus, said additional bearing loads induced by misaligning said headstock apparatus and said tailstock apparatus out of a stance of alignment.

34. The device of claim 32, wherein
said headstock interface assembly further defines a gap between said interface mounting module and said headstock workpiece mounting module, and
said gap is configured to enable said pitch, yaw and roll movement of said headstock workpiece mounting module.

35. A device comprising a workpiece positioner assembly, said workpiece positioner assembly comprising:
a headstock apparatus configured to rotate a workpiece and comprising a headstock interface assembly, wherein
said headstock interface assembly is configured to secure said workpiece to said headstock apparatus, and
said headstock interface assembly comprises a bearing configured to enable pitch, yaw and roll movement of said headstock interface assembly relative to said headstock apparatus;
a tailstock apparatus configured to support said workpiece in cooperation with said headstock apparatus and comprising a tailstock interface assembly, wherein
said tailstock interface assembly is configured to secure said workpiece to said tailstock apparatus, and
said tailstock interface assembly comprises a tailstock bearing configured to enable axial movement of said workpiece relative to said tailstock apparatus; and
wherein said headstock interface assembly and said tailstock interface assembly are each configured to eliminate additional bearing loads induced by misaligning said headstock apparatus or said tailstock apparatus out of a stance of alignment.

36. The device of claim 35, wherein said tailstock apparatus further comprises a tailstock pedestal, wherein said tailstock pedestal is mounted upon a frame or floor, and wherein said tailstock interface assembly is mounted to said tailstock pedestal.

37. The device of claim 36, wherein
said tailstock interface assembly further comprises a shaft and a tailstock workpiece mounting module,
said shaft is positioned within said tailstock workpiece mounting module,
said tailstock workpiece mounting module is secured to a section of said workpiece, and
said shaft is secured to said tailstock pedestal.

38. The device of claim 37, wherein said shaft defines a hollow interior for passage of electrical connections, pneumatic connections, and combinations thereof.

39. The device of claim 37, wherein said tailstock bearing defines a substantially spherical bearing positioned within said tailstock workpiece mounting module, and wherein said shaft is slideably engaged within said substantially spherical bearing which said engagement enables said axial movement of said workpiece relative to said tailstock apparatus.

40. The device of claim 39, wherein said substantially spherical bearing is configured to enable pitch, yaw and roll movement of said tailstock workpiece mounting module relative to said tailstock apparatus.

41. The device of claim 39, wherein said engagement of said shaft within said substantially spherical bearing imparts said headstock apparatus and said tailstock apparatus to rotate said workpiece without imposing additional bearing loads on said headstock apparatus and said tailstock apparatus, said additional bearing loads induced by misaligning said headstock apparatus and said tailstock apparatus out of a stance of alignment.

42. The device of claim 37, wherein said tailstock apparatus further comprises a shaft clamp, and wherein said shaft clamp is configured to secure said shaft to said tailstock pedestal.

43. A device comprising a workpiece positioner assembly, said workpiece positioner assembly comprising:
a headstock apparatus configured to rotate a workpiece and comprising a headstock faceplate and headstock interface assembly, said headstock interface assembly comprising an interface mounting module, a headstock workpiece mounting module, and a guide module comprising a bushing block and a pin, wherein
said headstock workpiece mounting module comprises a substantially spherical bearing configured to enable pitch, yaw and roll movement of said headstock workpiece mounting module relative to said headstock apparatus,
said interface mounting module is secured to said headstock faceplate,
said headstock workpiece mounting module is secured to said interface mounting module,
said headstock workpiece mounting module is configured to secure said workpiece to said headstock apparatus,
said guide module is secured to said interface mounting module,
said pin is in communication with said headstock workpiece mounting module,
said bushing block is positioned between said guide module and said pin, and
said bushing block enables said pin to rotate and translate within said guide module providing pitch and yaw compliance; and
a tailstock apparatus configured to support said workpiece in cooperation with said headstock apparatus and comprising a substantially spherical pillow block bearing and a tailstock interface assembly, wherein
said tailstock interface assembly is configured to secure said workpiece to said tailstock apparatus, and
said tailstock interface assembly comprises a shaft and a tailstock workpiece mounting module, wherein
said tailstock workpiece mounting module is secured to said shaft,
said shaft is positioned within said substantially spherical pillow block bearing, and
said substantially spherical pillow block bearing is configured to enable axial movement of said workpiece relative to said tailstock apparatus.

44. A device comprising a workpiece positioner assembly, said workpiece positioner assembly comprising:
a headstock apparatus configured to rotate a workpiece and comprising a headstock faceplate and headstock interface assembly, said headstock interface assembly comprising a hub, a headstock workpiece mounting module, and a guide module comprising a cam follower bearing, wherein
said headstock workpiece mounting module comprises a substantially spherical bearing configured to enable pitch, yaw and roll movement of said headstock workpiece mounting module relative to said headstock apparatus,
said hub is secured to said headstock faceplate,
said headstock workpiece mounting module is secured to said hub, said headstock workpiece mounting module is configured to secure said workpiece to said headstock apparatus, said guide module is secured to said headstock faceplate, and said cam follower bearing is in communication with said headstock workpiece mounting module, wherein said cam follower bearing is configured to rotate and translate within said headstock workpiece mounting module providing pitch and yaw compliance; and a tailstock apparatus configured to support said workpiece in cooperation with said headstock apparatus and comprising a tailstock interface assembly and a shaft clamp, wherein said tailstock interface assembly is configured to secure said workpiece to said tailstock apparatus, and said tailstock interface assembly comprises a shaft and a tailstock workpiece mounting module, wherein said tailstock workpiece mounting module comprises a substantially spherical bearing, said shaft is slideably engaged within said substantially spherical bearing, said shaft is positioned within said shaft clamp, and said substantially spherical bearing is configured to enable axial movement of said workpiece relative to said tailstock apparatus.

\* \* \* \* \*

UNITED STATES PATENT AND TRADEMARK OFFICE
CERTIFICATE OF CORRECTION

PATENT NO. : 7,434,491 B1
APPLICATION NO. : 10/754315
DATED : October 14, 2008
INVENTOR(S) : Sutton, Jr. et al.

Page 1 of 1

It is certified that error appears in the above-identified patent and that said Letters Patent is hereby corrected as shown below:

Title Page; item (57);
ABSTRACT: "A workpiece positioner assembly comprises a headstock apparatus that is configured to rotate a workpiece A headstock interface assembly is configured to secure the workpiece to the headstock apparatus and comprises a bearing configured to enable pitch, yaw and roll movement of the headstock interface assembly relative to the headstock apparatus. The workpiece positioner assembly further comprises a tailstock apparatus configured to support the workpiece in cooperation with the headstock apparatus. The tailstock apparatus comprises a tailstock interface assembly that is configured to secure the workpiece to the tailstock apparatus. The tailstock interface assembly further comprises a tailstock bearing configured to enable axial movement of the workpiece relative to the tailstock apparatus."

should read --A workpiece positioner assembly comprises a headstock apparatus that is configured to rotate a workpiece. A headstock interface assembly is configured to secure the workpiece to the headstock apparatus and comprises a bearing configured to enable pitch, yaw and roll movement of the headstock interface assembly relative to the headstock apparatus. The workpiece positioner assembly further comprises a tailstock apparatus configured to support the workpiece in cooperation with the headstock apparatus. The tailstock apparatus comprises a tailstock interface assembly that is configured to secure the workpiece to the tailstock apparatus. The tailstock interface assembly further comprises a tailstock bearing configured to enable axial movement of the workpiece relative to the tailstock apparatus.--

Col. 5, Line 41 "positioner assembly J." should read --positioner assembly 1--

Col. 6, Line 7 "assembly 2 when" should read --assembly 1 when--

Signed and Sealed this

Twenty-fourth Day of November, 2009

David J. Kappos
*Director of the United States Patent and Trademark Office*